United States Patent [19]

Urushibata

[11] Patent Number: 4,839,826

[45] Date of Patent: Jun. 13, 1989

[54] AFFINE CONVERSION APPARATUS USING A RASTER GENERATOR TO REDUCE CYCLE TIME

[75] Inventor: Yukio Urushibata, Tokyo, Japan

[73] Assignee: Kabushiki Kaisha Toshiba, Kawasaki, Japan

[21] Appl. No.: 43,021

[22] Filed: Apr. 27, 1987

[30] Foreign Application Priority Data

Apr. 30, 1986 [JP] Japan .................................. 61-98222

[51] Int. Cl.[4] .............................................. G06K 9/32
[52] U.S. Cl. .................................... 364/518; 340/747; 364/521; 382/44; 382/46
[58] Field of Search ................................ 364/518, 521; 382/44–46; 340/727, 747, 798, 799, 800

[56] References Cited

U.S. PATENT DOCUMENTS

| 3,976,982 | 8/1976 | Eiselen .................... 382/44 |
| 4,052,699 | 10/1977 | Micka et al. ............ 382/46 |
| 4,415,928 | 11/1983 | Strolle et al. ........ 340/727 X |
| 4,437,121 | 3/1984 | Taylor et al. ......... 382/46 X |
| 4,636,783 | 1/1987 | Omachi .................. 382/46 X |
| 4,672,680 | 6/1987 | Middleton ............ 364/521 X |
| 4,680,630 | 7/1987 | Field ..................... 382/46 X |

Primary Examiner—Gary V. Harkcom
Assistant Examiner—H. R. Herndon
Attorney, Agent, or Firm—Cushman, Darby & Cushman

[57] ABSTRACT

An image processing apparatus including an affine conversion address generator, an image read memory, and an image write memory are connected via a control bus. The image read and write memories are connected via an image bus which operates independently of the control bus. Image data, which is designated by an affine conversion address output from the affine conversion address generator onto the control bus, is read out from the image read memory. The read image data is then transferred to the image write memory together with a busy signal indicating data transfer via the image bus. The image write memory stores the transferred image data in accordance with raster addresses sequentially generated therein.

6 Claims, 4 Drawing Sheets

STATUS OF ADDRESS BUS 21

STATUS OF DATA BUS 22

FIG. 3
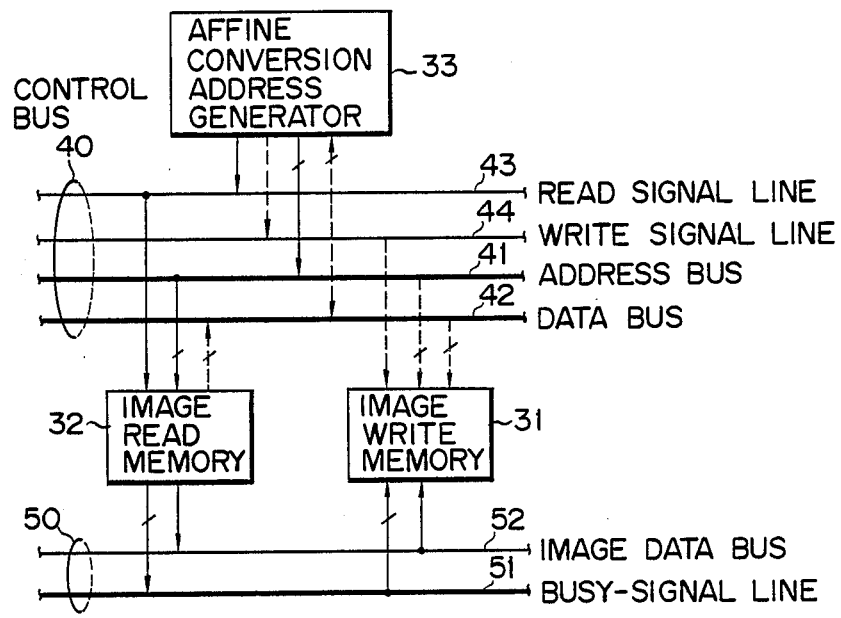
FIG. 4
| 23 | 22 20 | 19    10 | 9    0 |
|----|-------|----------|--------|
| B  | GM    | Y        | X      |
FIG. 5
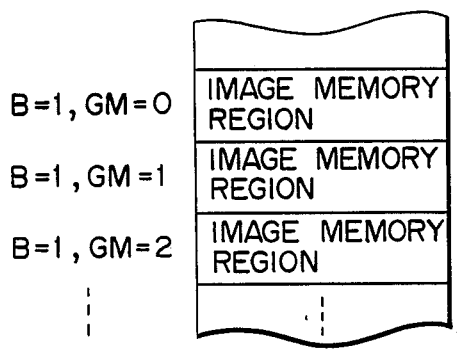

AFFINE CONVERSION APPARATUS USING A RASTER GENERATOR TO REDUCE CYCLE TIME

The present invention is related to U.S. application Ser. No. 07/043,251 Urushibata filed in the Patent Office on even date.

BACKGROUND OF THE INVENTION

The present invention relates to an image processing apparatus having an affine conversion for performing reduction, enlargement, and rotation of an image.

According to affine conversion as one of the functions of an image processing apparatus, an image stored in a read (input) image memory is reduced, enlarged, or rotated and is output to a write (output) image memory. An image processing apparatus having the affine conversion function conventionally has an arrangement as shown in FIG. 1. By means of the affine conversion of the image processing apparatus shown in FIG. 1, image data is written in write image memory 11 in accordance with a raster operation. The image data is read out from an address (X, Y) of read image memory 12 that corresponds to the raster address (I, J) of write image memory 11. Address (X, Y) is calculated by affine conversion address generator 13 in accordance with the following equations:

$$X = aI + bJ + c \tag{1}$$

$$Y = dI + eJ + f \tag{2}$$

where a, b, c, d, e, and f are constants.

Address generator 13 calculates address (X, Y) of memory 12 that corresponds to address (I, J) of memory 11 and outputs it onto address bus 21 of control bus 20 as an image input read address, as shown in FIG. 2A. In this case, address generator 13 supplies a read signal onto read signal line 23 of control bus 20. In response to the read signal received from control bus 20, image data is read out from a pixel position of memory 12 designated by address (X, Y) input through address bus 21.

The image data read out from memory 12, i.e., the image data at the position of address (X, Y) is supplied to data bus 22 of control bus 20, as shown in FIG. 2B. Address generator 13 fetches and latches the image data on data bus 22. In the next cycle, address generator 13 outputs the latched data onto data bus 22 and address (I, J) of memory 11 onto address bus 21 (see FIG. 2A). At the same time, address generator 13 supplies a write signal onto write signal line 24 of control bus 20. In response to the write signal, data input through data bus 22 is written at a pixel position of memory 11 designated by address (I, J) input through address bus 21. The above operation is repeated every 2 bus cycles (2T) of control bus 20 while raster address (I, J) is being updated.

In this manner, affine conversion address generator 13 of the conventional image processing apparatus shown in FIG. 1 requires 2 cycles for one-pixel affine conversion, that is, a read cycle for transferring affine conversion address (X, Y) to read image memory 12 together with a read signal and reading image data from memory 12, and a write cycle for transferring the read image data to write image memory 11 together with raster address (I, J) and a write signal and enabling writing to memory 11. Therefore, the conventional image processing apparatus cannot perform high-speed affine conversion.

SUMMARY OF THE INVENTION

It is an object of the present invention to provide an image processing apparatus which can perform a write cycle for storing image data in a write image memory location designated by a raster address even during a read cycle for reading the image data from a read image memory location designated by an affine conversion address, thereby enabling high-speed affine conversion.

In order to achieve the above object, the image processing apparatus of the present invention comprises an affine conversion address generator for generating an image data read affine conversion address based on a raster address and outputting image memory read and write signals, a control bus, connected to the affine conversion address generator, for transferring the affine conversion address and the read and write signals from the affine conversion address generator, an image bus, connected to first and second image memories, for operating independently of the control bus in order to transfer image data output from the first image memory and a busy signal; first image memory control means for reading out the image data from the first image memory, outputting the read image data onto the image bus, and outputting the busy signal onto the image bus, in response to the affine conversion address output from the affine conversion address generator onto the control bus and the read signal, and second image memory control means for storing, in response to the busy signal on the image bus, the image data on the image bus in accordance with the raster address.

According to the present invention, a write cycle for storing image data in a second image memory (write image memory) location designated by a raster address can be performed even during a read cycle for reading the image data from a first image memory (read image memory) location designated by an affine conversion address.

BRIEF DESCRIPTION OF THE DRAWINGS

FIG. 3 is a block diagram showing an image processing apparatus according to an embodiment of the present invention;

FIG. 4 shows the format of an address transferred through address bus 41 shown in FIG. 3;

FIG. 5 is a view showing a correspondence between an image memory area allocated in an address space, and base number B and image memory number GM of an address, respectively, of the image processing apparatus shown in FIG. 3;

DETAILED DESCRIPTION OF THE PREFERRED EMBODIMENTS

Figure 1:
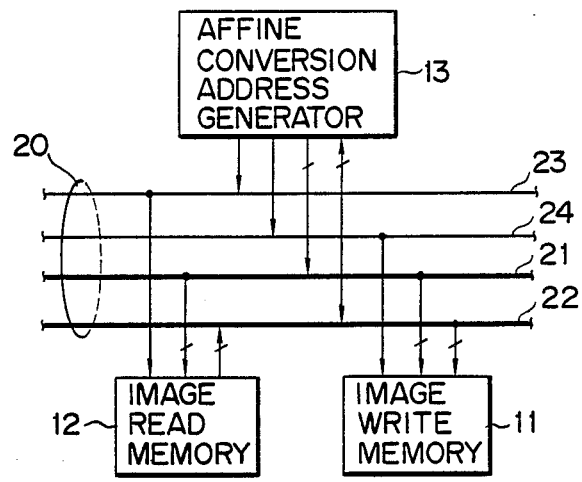
FIG. 1 is a block diagram of a conventional image processing apparatus.
Figure 2A:
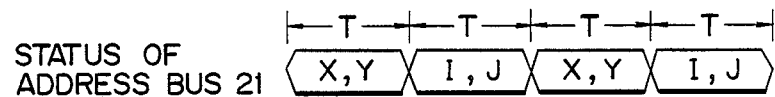
FIGS. 2A and 2B are timing charts for explaining the operation of the image processing apparatus shown in FIG. 1.
Figure 2B:
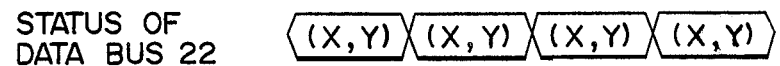

FIG. 3 is a block diagram of an image processing apparatus according to an embodiment of the present invention. This image processing apparatus has write image memory 31, read image memory 32, and affine conversion address generator 33. Write and read image memories 31 and 32 and affine conversion address generator 33 are connected to control bus 40 together with a CPU (not shown) for controlling the entire apparatus. Memories 31 and 32 are also connected to image bus 50 independently of control bus 40. The arrangement of control bus 40 is similar to that of control bus 20 shown in FIG. 1. Control bus 40 has address bus 41 for transferring, e.g., a 24-bit address, data bus 42 for transferring data of various types, and read and write signal lines 43 and 44. Image data bus 50 has image data bus 51 for transferring image data, and busy signal line 52 for indicating that bus 51 is busy, in other words, image data is being transferred.

In this embodiment, a type of memory-mapped I/O method is employed. Therefore, on control bus 40, the image memory areas of various image memories connected to control bus 40 are linearly assigned to the second 8-megabyte area of the 16-megabyte address space, supported by a 24-bit address, in units of megabytes.

FIG. 4 shows the format of an address when the address transferred through address bus 41 indicates a pixel position in the image memory area, and FIG. 5 shows image memory areas allocated in the address space supported by this address. The address shown in FIG. 4 consists of base number B (1 bit), image memory number GM (3 bits), and Y and X addresses (both 10 bits) as a two-dimensional address. Base number B designates an address space for either the image memory or control address area. Image memory number GM designates one 1 M-byte image memory area when base number B designates an address space for the image memory area (in this case B=1). The Y and X addresses indicate the pixel position in the image memory area.

Figure 6:
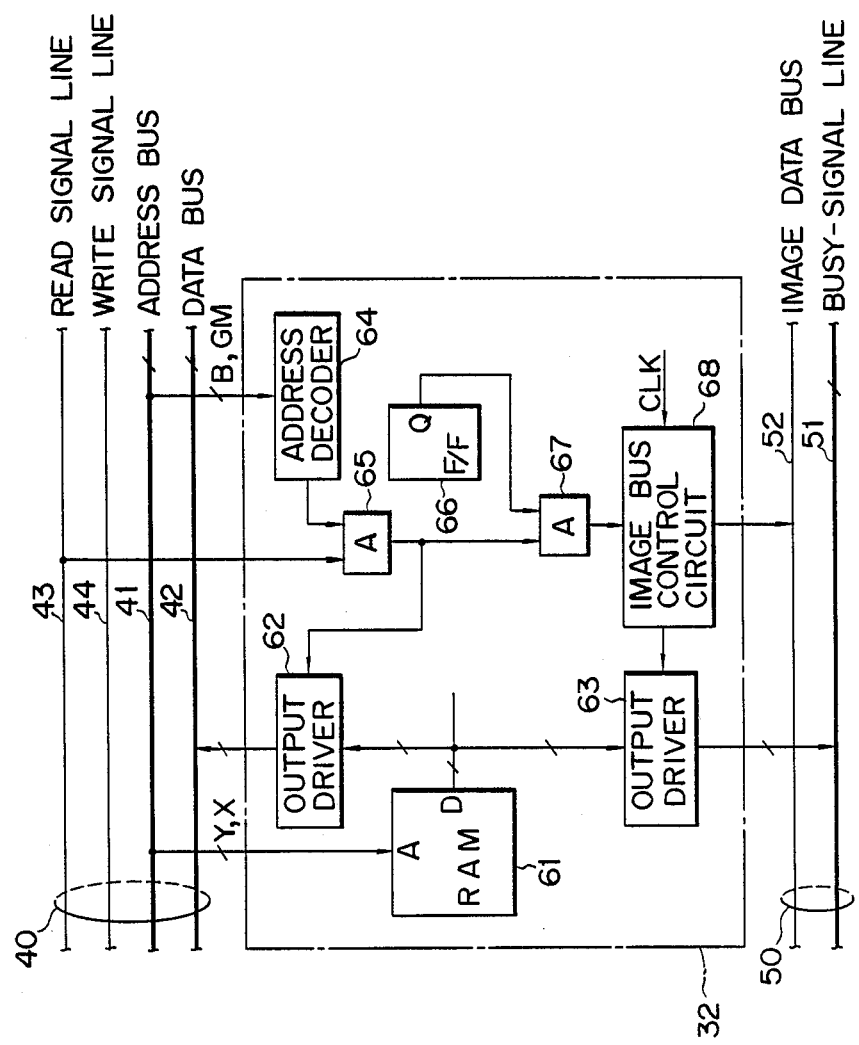
FIG. 6 is a block diagram showing in detail read image memory 32 shown in FIG. 3.

FIG. 6 shows the block diagram of read image memory 32. The address area of 1 M-byte RAM 61 is assigned to the image memory area in the address space corresponding to memory 32. Address port A of RAM 61 receives Y and X addresses through address bus 41. Output driver 62 supplies image data read out from RAM 61 onto data bus 42 of control bus 40. Output driver 63 supplies image data read out from RAM 61 onto image data bus 51 of image bus 50.

Address decoder 64 decodes base number B and image memory bus GM of the address, shown in FIG. 4, that are supplied through address bus 41, detects whether an image memory area to which an address of image memory 32 is assigned is designated, i.e., whether the memory space of RAM 61 is designated, and outputs an address detection signal to AND gate 65. AND gate 65 also receives a read signal from read signal line 43. An output signal from gate 65 is used to control output from output driver 62. Flip-flop (to be referred to as F/F hereinafter) 66 is set by a CPU (not shown). When F/F 66 is set, it means that read image memory 32 is designated. AND gate 67 ANDs a Q output signal from F/F 66 and an output signal from AND gate 65. In synchronism with clock signal CLK, image bus control circuit 68 outputs a busy signal to busy signal line 52 of image bus 50 and an output control signal to output driver 63 based on an output signal from AND gate 67 and clock signal CLK supplied from a clock signal line (not shown) of image bus 50.

Figures 7, 8:
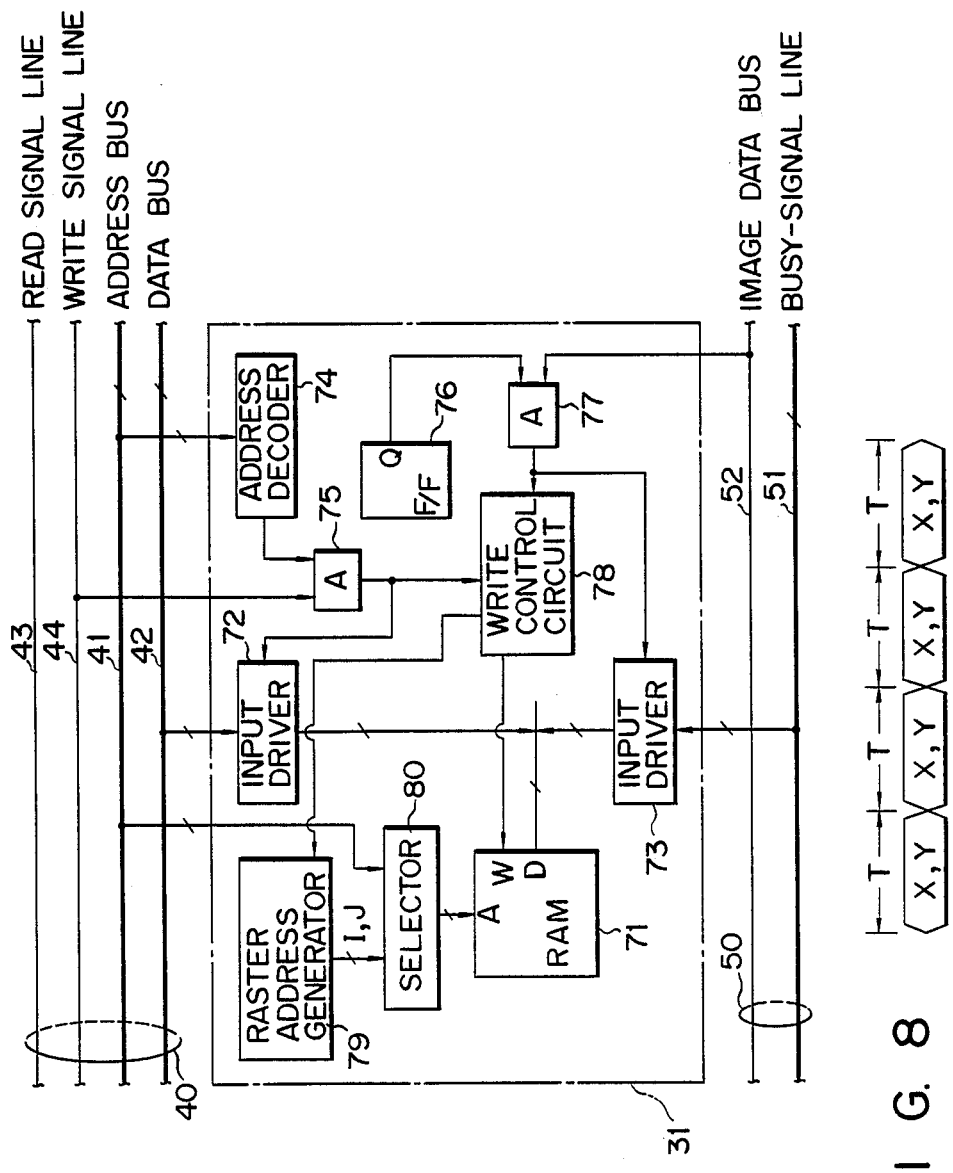
FIG. 7 is a block diagram showing in detail write image memory 31 shown in FIG. 3.
FIG. 8 is a timing chart for explaining the status of address bus 41 shown in FIG. 3.

FIG. 7 is a block diagram of write image memory 31. The address area of 1-M byte RAM 71 for storing image data is assigned to the image memory area in the address space corresponding to memory 31. Address port A of RAM 71 receives, through selector 80, Y and X addresses of the address shown in FIG. 4 input through address bus 41. Input driver 72 supplies image data supplied from data bus 42 of control bus 40 to data port D of RAM 71. Input driver 73 supplies image data from image data bus 51 of image bus 50 to data port D of RAM 71.

Address decoder 74 decodes base number B and image memory number GM of the address, shown in FIG. 4, which are supplied through address bus 41, detects whether an image memory area to which an address of image memory 31 is assigned is designated, i.e., whether the memory space of RAM 71 is designated, and outputs an address detection signal to AND gate 75. AND gate 75 also receives a write signal from write signal line 44. An output signal from gate 75 is used to control input to input driver 72. F/F 76 is set by a CPU (not shown). When F/F 76 is set, it means that read image memory 31 is designated. AND gate 77 ANDs a Q output signal from F/F 76 and a busy signal from busy signal line 52 of image bus 50. An output signal from AND gate 77 is used to control input to input driver 73. Write control circuit 78 controls write operation to RAM 71 in accordance with the output signal from AND gate 75 or 77. Control circuit 78 also instructs raster address generator 79 to generate a raster address in response to the output signal from AND gate 77.

Raster address generator 79 generates raster address (I, J) of image memory area (RAM 71) in response to the instruction from write control circuit 78. Selector 80 selectively outputs either the raster address from address generator 79 or the Y and X addresses from address bus 41 to address port A of RAM 71. The raster operation area of address generator 79 is preset by the CPU.

The operation of the image processing apparatus according to the embodiment of the present invention will be described with reference to the timing chart of FIG. 8.

When affine conversion is performed, the CPU sets up write and read image memories 31 and 32 and affine conversion address generator 33 in a required manner and initializes them. Then, both F/Fs 76 and 66 of memories 31 and 32, respectively, are set. Data indicating the area as the target of a raster operation is set in raster address generator 79 of memory 31. Address generator 33 calculates affine conversion address (X, Y) based on raster address (I, J), used in writing image data in RAM 71 of memory 31, in accordance with equations (1) and (2). Subsequently, affine conversion address generator 33 adds base number B of B=1 and image memory number GM designating read image memory 32 to affine conversion address (X, Y), and supplies the resultant 24-bit address onto address bus 41 of bus 40. In this case, address generator 33 supplies a read signal of logic "1" onto read signal line 43. Address generator 33 repeats the above operation in units of cycles (at every 1T) of control bus 40 while updating raster address (I, J) based on the raster operation. Therefore, affine conversion address (X, Y) is output onto address bus 41 at every bus cycle of control bus 40, as shown in FIG. 8, and affine conversion address (X, Y) and raster address (I, J) are not alternately output at every 1T, unlike in the conventional case.

The Y and X addresses supplied through address bus 41 are guided to address port A of RAM 61 of read image memory 32, and the image data at the address position (pixel position) in RAM 61 designated by the X and Y addresses is read out to output drivers 62 and 63. The base number B and image memory number GM on address bus 41 are guided to address decoder 64 of read image memory 32. When base number B is 1 and memory number GM designates memory 32, as in this case, address decoder 64 outputs an address detection signal of logic "1" to AND gate 65. AND gate 65 ANDs a read signal on read signal line 43 and this address detection signal, and outputs an output signal of logic "1" to driver 62 and AND gate 67. Output driver 62 is enabled by the output signal of logic "1" from AND gate 65 and supplies the image data read out from RAM 61 onto data bus 42 of control bus 40. The above operation is similar to that of read image memory 12 shown in FIG. 1.

AND gate 67 ANDs an output signal from AND gate 65 and a Q output signal of logic "1" from F/F 66, and outputs an output signal of logic "1". While the output signal from AND gate 67 is logic "1", image bus control circuit 68 outputs a busy signal of logic "1" synchronized with clock signal CLK onto busy signal line 52 of image bus 50 and enables output driver 63. Output driver 63 then supplies the image data read out from RAM 61 onto image data bus 51 of image bus 50.

The image data on image bus 50, i.e., the image data stored at a location in RAM 61 indicated by affine conversion address (X, Y), is supplied to input driver 73 of write image memory 31. The busy signal of logic "1" on busy signal line 52 is supplied to AND gate 77 of memory 31. AND gate 77 also receives a Q output signal of logic "1" from F/F 76. As a result, AND gate 77 outputs a signal of logic "1" to input driver 73 and write control circuit 78. Input driver 73 inputs the image data, supplied through image data bus 51, to RAM 71 when the output signal from AND gate 77 is logic "1". When the output signal from AND gate 77 is logic "1", write control circuit 78 instructs raster address generator 79 to generate a raster address and supplies a write signal to RAM 71, thereby performing write control of RAM 71. Write control circuit 78 performs write control of RAM 71 when the output signal from gate 75 is at logic "1" as well. Upon reception of an instruction from write control circuit 78 to generate a raster address, address generator 79 in memory 31 starts raster operation in an area designated by the CPU in advance, and updates raster address (I, J). Raster address (I, J) generated by address generator 79 is selected by selector 80 and output to address port A of RAM 71. Thus, the image data on image data bus 51 which is input to RAM 61 through input bus 73 is written at the address position (pixel position) in RAM 61 designated by raster address (I, J), selectively output from selector 80, at a timing of a write signal from control circuit 78.

As described above, in this embodiment, image data read out from a position of affine conversion address (X, Y) of read image memory 32 is transferred to write image memory 31 via image bus 50, independent from control bus 40, together with a busy signal, and the image data read out from memory 32 can be transferred to memory 31 in accordance with the busy signal on the busy signal line of image bus 50. Furthermore, the image data input to memory 31 is written at its correct pixel position in accordance with raster address (I, J) generated by raster address generator 79 of memory 31.

Therefore, affine conversion address generator 33 need only repeat a read cycle (input operation) to generate affine conversion address (X, Y) and a read signal in order to read out image data from memory 32. Unlike in a conventional case, address generator 33 need not repeat read and write cycles, i.e., a cycle to output raster address (I, J) and a write signal onto control bus 40, together with the image data, in order to write the image data, read out from memory 32, in memory 31. In fine, according to this embodiment, affine conversion can be performed at a speed twice that of a conventional case. Note that raster address generator 79 is generally adopted for the purpose of raster operation of RAM 71. In this embodiment, address generator 79 is utilized to generate raster address (I, J) for affine conversion.

Image data output onto data bus 42 of control bus 40 from output driver 62 of read image memory 32 will now be briefly described. This image data is supplied to input driver 72 of write image memory 31. Input driver 72 is input-enabled only when address decoder 74 detects an address, i.e., when base number B on address bus 41 is 1 and image memory number GM indicates memory 31, and when write signal line 44 supplies a write signal of logic "1". Therefore, when affine conversion address generator 33 repeats a read cycle, as in this embodiment, image data is not input by input driver 72.

In the above embodiment, a description is made based on an assumption that two types of image memories are provided, i.e., one for writing (write image memory 31) and one for reading (read image memory 32), for the sake of simplicity. However, it is more preferable that an image memory has both writing/reading functions and can be switched as a write image memory/read image memory by the CPU.

What is claimed is:
1. An image processing apparatus comprising:
an affine conversion address generator for generating an image data read affine conversion address based on a raster address and outputting image memory read and write signals;
a first image memory for storing original image data;
a second image memory for storing an affine-converted image data corresponding to an affine converted version of said original image data;
a control bus, connected to said affine conversion address generator and said first and second image memories, for conducting and transferring the image data read affine conversion address and the read and write signals from said affine conversion generator to said first and second memories;
an image bus, connected to said first and second image memories, for operating independently of said control bus in order to transfer the image data output from said first image memory to said second memory;
first image memory control means, coupled to said first image memory and to said image bus, for reading out the original image data from said first image memory, outputting the original image data onto said image bus, and for selectively producing a busy signal for said image bus, in response to the affine conversion address output from said affine conversion address generator and the read signal, wherein said image bus is also for transferring said busy signal from said first image memory control means; and second image memory control means, coupled to said second image memory and to said image bus, for storing, in response to the busy signal on said image bus, the original image data on said image bus in accordance with the raster address, said original data stored at said raster address constituting said affine-converted image data.

2. An apparatus according to claim 1, wherein said image bus comprises an image data bus for transferring image data and a busy signal line for indicating that the image data is being transferred.

3. An apparatus according to claim 1, wherein said first and second image memories each have a plurality of image memory area address spaces, linearly assigned in units of predetermined memory capacities and have a control address are with address spaces assigned to said affine conversion address generator and input/output units of said first and second image memories, which are connected to said control bus.

4. An apparatus according to claim 3, wherein a format of an affine conversion address comprises:
 a first field for designating one of: (a) said image memory area address spaces and (b) said control address area address space;
 a second field for designating one of said plurality of image memory area address spaces when said first field designates said image memory area address spaces; and
 a third field for designating a two-dimensional address indicating a pixel position in the image memory area selected by said second field.

5. An apparatus according to claim 1, wherein said affine conversion address generator outputs the affine conversion address and the read control signal to said control bus at every bus cycle of said control bus.

6. An apparatus according to claim 1, wherein said second image memory has a raster address generator.

* * * * *